United States Patent
Konuma et al.

(10) Patent No.: US 7,529,248 B2
(45) Date of Patent: May 5, 2009

(54) NETWORK DEVICE PROVIDED WITH ETHERNET INTERFACE

(75) Inventors: Yoichi Konuma, Kawasaki (JP); Koichi Saiki, Kawasaki (JP); Takashi Fukagawa, Kawasaki (JP); Masashige Kawarai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 496 days.

(21) Appl. No.: 10/972,763

(22) Filed: Oct. 25, 2004

(65) Prior Publication Data

US 2005/0213512 A1 Sep. 29, 2005

(30) Foreign Application Priority Data

Mar. 29, 2004 (JP) .............................. 2004-096082

(51) Int. Cl.
H04L 12/28 (2006.01)
H04L 12/56 (2006.01)
G01R 31/08 (2006.01)
G06F 11/00 (2006.01)
G08C 15/00 (2006.01)
H04J 1/16 (2006.01)
H04J 3/14 (2006.01)
H04L 1/00 (2006.01)
H04L 12/26 (2006.01)
G06F 15/16 (2006.01)

(52) U.S. Cl. ..................... 370/395.2; 370/230; 709/229
(58) Field of Classification Search .................. 370/389
See application file for complete search history.

(56) References Cited

U.S. PATENT DOCUMENTS 6,349,331 B1 * 2/2002 Andra et al. ................ 709/220
7,242,693 B1 * 7/2007 Acharya et al. ............. 370/445
2001/0043565 A1 * 11/2001 Chen et al. .................. 370/230
2002/0133631 A1 9/2002 Yun
2003/0235214 A1 12/2003 Leroux et al.

FOREIGN PATENT DOCUMENTS

| JP | 10-271143 | 10/1998 |
|---|---|---|
| KR | 1999-43717 | 6/1999 |
| KR | 2000-39890 | 7/2000 |
| KR | 2002-0061230 | 7/2002 |

OTHER PUBLICATIONS

Partial European Search Report dated Mar 14, 2006.
"IEEE Std. 802.3-2002 (Revision o f IEEE Std 802.3, 2000 Edition)" Mar. 8, 2002, http://ieeexplore.ieee.org p. 21, p. 213-260.
Mirko Kulpa. "Duplex Mismatch and Autonegotiation im Ethernet" Network Lab, May 6, 2005, http://www.nwlab.net/art/duplexmismatch/duplex-mismatch.html.
Korean Office Action dated May 9, 2006.

* cited by examiner (Continued)

Primary Examiner—Hassan Kizou
Assistant Examiner—Andrew Chriss
(74) Attorney, Agent, or Firm—Katten Muchin Rosenman LLP (57) ABSTRACT

A network device provided with an Ethernet interface for interconnecting with another network device by auto negotiation, the network device comprising a link establishing function unit compulsorily establishing a link with the other network device and an on/off setting function unit setting the function of the link establishing function unit on or off and the link establishing function unit being comprised of a data transmission suppressing unit for suppressing the transmission of user data to the other network device until the sequence based on the auto negotiation is finished, whereby the problem of connectivity where the sequence of the auto negotiation repeats and no link can be established is solved.

5 Claims, 13 Drawing Sheets

(AUTO NEGOTIATION SET ON)

(SEQUENCE WHEN PROBLEM OF CONNECTIVITY OCCURS)

NETWORK DEVICE PROVIDED WITH ETHERNET INTERFACE

CROSS-REFERENCE TO RELATED APPLICATIONS

The present application claims priority under 35 U.S.C. § 119 from Japanese Patent Application No. 2004-096082 filed on Mar. 29, 2004, the contents of which are incorporated herein by reference.

BACKGROUND OF THE INVENTION

1. Field of the Invention

The present invention relates to a layer 2/layer 3 switch, transmission device, or other network device provided with an Ethernet (registered trademark, same below) interface (Ethernet device), more particularly relates to a network device designed to improve the operation of an auto negotiation function supported by that device used in a layer 2/layer 3 network over which carriers are primarily launching new services. Note that the auto negotiation function is a function for automatic selection of a communication mode among network devices and is defined by IEEE 802.3.

2. Description of the Related Art

Along with the faster speeds and broader bands of data communications in recent years, demand for services by inexpensive Ethernet interfaces able to accommodate user interfaces as well has been soaring.

At the present time, connection of Ethernet interfaces used by carriers requires use of the auto negotiation function defined by IEEE 802.3. This auto negotiation function is a function for automatic selection of the communication mode and is for realizing so-called "plug & play" connection not requiring any manual setting, that is, enabling immediate communication after being plug-in. With this function, two network devices exchange information on the communication modes such as the line speeds supported and can automatically select the optimal communication mode for the two. Examples of the communication modes are given next.

i) Case of 10/100 Base-TX
  Line speed (10 Mbps or 100 Mbps)
  Duplex (full duplex or half duplex)
  Flow (flow control on or flow control off)
ii) Case of 1000 Base-X
  Flow (flow control on or flow control off)
  Line speed (1000 Mbps fixed)
  Duplex (full duplex fixed)

As explained above, the auto negotiation function is an effective function for realizing plug & play connection between network devices, but further improvement of its operation is demand to further improve its effectiveness.

Note that as known art relating to the present invention, there is Japanese Unexamined Patent Publication (Kokai) No. 10-271143. While this known art, however, is the same as the present invention from the viewpoint of relating to a "negotiation function", it specifically relates to a negotiation function for TCP connection, so in fact differs from the present invention. The present invention relates to auto negotiation for selecting a communication mode at a physical layer.

The above auto negotiation function supported by the network devices (Ethernet devices) has the problem that the interconnectivity is not perfect, that is, there is a problem in connectivity between devices. This is due to the vagueness of the provisions of IEEE 802.3 and has resulted in the various manufacturers supplying physical layer chips (PHY chips) with different specifications and consequently the incompleteness of connectivity when setting (turning on) auto negotiation. Note that this problem will be explained in more detail later while referring to the drawings.

SUMMARY OF THE INVENTION

An object of the present invention is to provide a network device provided with an Ethernet interface able to eliminate the problem of incomplete interconnectivity of devices.

To attain the above object, the present invention provides a network device (10A) provided with an Ethernet interface for interconnecting with another network device (10B) by auto negotiation, the device comprising a link establishing means (11) for compulsorily establishing a link with the other device (10B) and an on/off setting means (12) for setting the function of the link establishing means (11) on or off. The link establishing means (11) is preferably comprised of a data transmission suppressing unit (21) for suppressing the transmission of user data to the other device (10B) until the sequence based on the auto negotiation is finished. This solves the problem of connectivity where a link cannot be established even with repeated sequences of auto negotiation.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

Preferred embodiments of the present invention will be described in detail below while referring to the attached figures.

Figure 1:
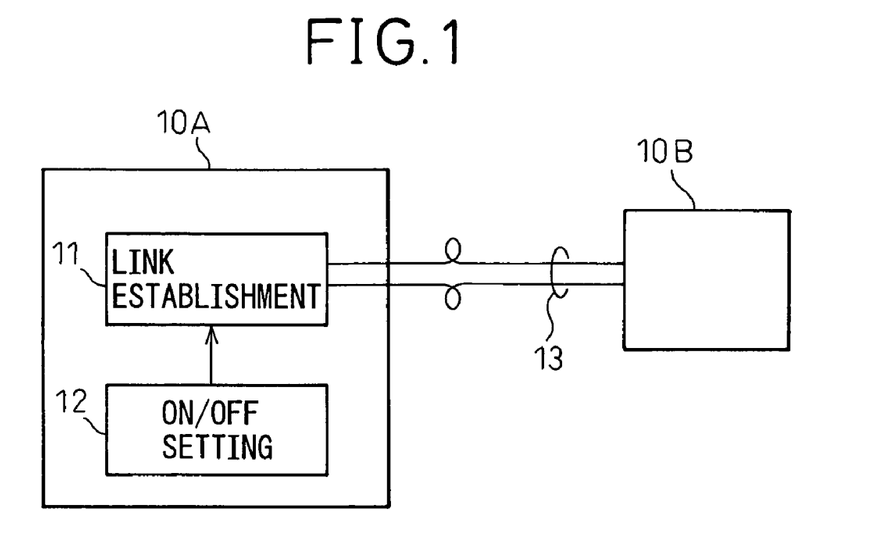
FIG. 1 is a view of the basic configuration according to the present invention.

FIG. 1 is a view of the basic configuration of the present invention. In the figure, reference numeral 10A shows the network device in question. The device to be communicated with is indicated by reference numeral 10B.

This network device 10A is a network device provided with an Ethernet interface and interconnecting with the device 10B by auto negotiation. The point characterizing this device 10A is the provision of the illustrated link establishing means 11 and the on/off setting means 12. Specifically, these are the link establishing means 11 for compulsorily establishing a link 13 with the other device 10B and the on/off setting means 12 for setting on/off the function of the link establishing means 11.

By setting the on/off setting means 12 on, the link establishing means 11 built into the network device 10A operates, whereby the above problem of "connectivity among devices" is avoided and interconnectivity becomes complete.

According to the present invention, it is possible to provide a function able to improve the auto negotiation operation. This function is realized by three aspects.

The first aspect takes note of the point of the main cause of the above problem of connectivity, that is, the inability of the auto negotiation to end, and prohibits the transfer of user data until the auto negotiation is completely finished. These are two strategies for this. The first is not to transmit any user data (Ethernet frames) from the device 10A to the device 10B until the end of the auto negotiation. The second is to discard any frame received from the device 10B at the device 10A until the end of the auto negotiation.

The device 10A (same for the device 10B) may employ either of the first strategy (data nontransmission) and second strategy (received data discard). Most preferably, it is possible to employ both simultaneously.

The second aspect is the employment of the strategy of determining the cause of the problem of connectivity. The first aspect can solve the problem of connectivity faster and more accurately if combined with the second aspect.

The third aspect is the employment of the strategy of compulsorily executing the prescribed restart before finding the cause according to the second aspect when auto negotiation cannot end. This compulsory restart (executable manually as well) enables the auto negotiation to be safely concluded. This corresponds to compulsorily making the sequence of the auto negotiation proceed to the start state for a retry. It is possible to expect the problem of connectivity to be simply solved by this to a certain extent.

Before explaining the specific embodiments of the present invention, the background art of auto negotiation will be explained with reference to FIGS. 13 to 15 so as to clarify the effects brought about by the present invention.

Figure 13:
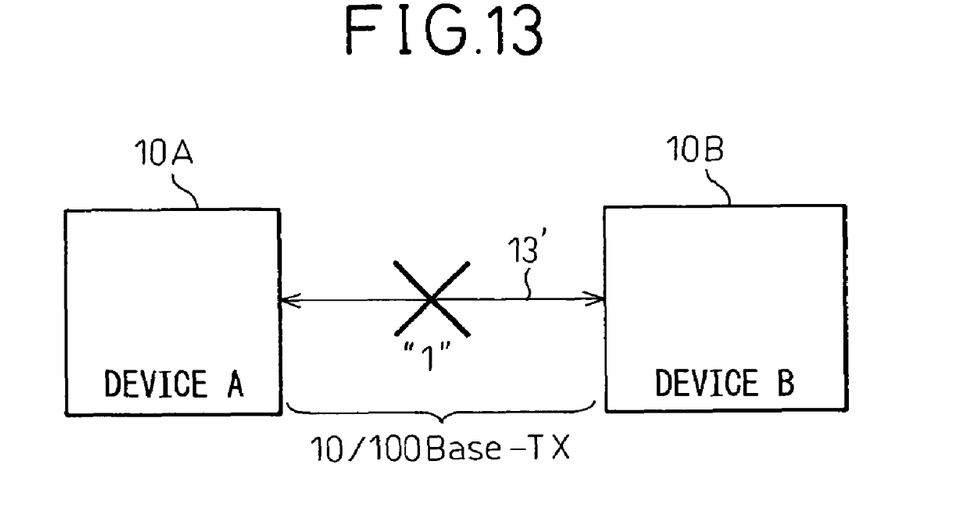
FIG. 13 is a view for explaining fault detection in a 10/100 Base-TX interface.

FIG. 13 is a view for explaining fault detection in a 10/100 Base-TX interface. In the figure, the adjoining network devices (Ethernet devices) 10A and 10B attempt to connect through a link 13'.

In the case of the 10/100 Base-TX, operation with the auto negotiation set off did not cause any particular obstacles in the carrier services. This is due to the cable (13') connecting the Ethernet devices 10A and 10B.

With a 10/100 Base-TX, a LAN cable (13') is used. This LAN cable is comprised of a transmission (TX) use line and a reception (RX) use line twisted together. A single LAN cable is therefore used to transmit and receive data.

When a fault occurs on the line (x mark of "1" in the figure), almost all of the time the entire LAN cable is broken. It is rare for only the transmission TX (or reception RX) line in the LAN cable to be broken. Therefore, the devices 10A and 10B connected to the two ends of the LAN cable can detect the "break" information of the line regardless of the on/off setting of the auto negotiation. Therefore, with a 10/100 Base-TX, operation with the auto negotiation function off is possible. Note that when setting the auto negotiation function on and the link will not be established, that is, data cannot be transferred, the carrier continues the operation with the auto negotiation function set off.

Therefore, when establishing a link by a single LAN cable, no problems occur in the auto negotiation operation. However, in a network where transmission (TX) optical fibers and reception (RX) optical fibers are provided separately such as in a GbE/10 GbE (Gigabit Ethernet) interface (optical interface), problems occur in the auto negotiation operation.

Figure 14:
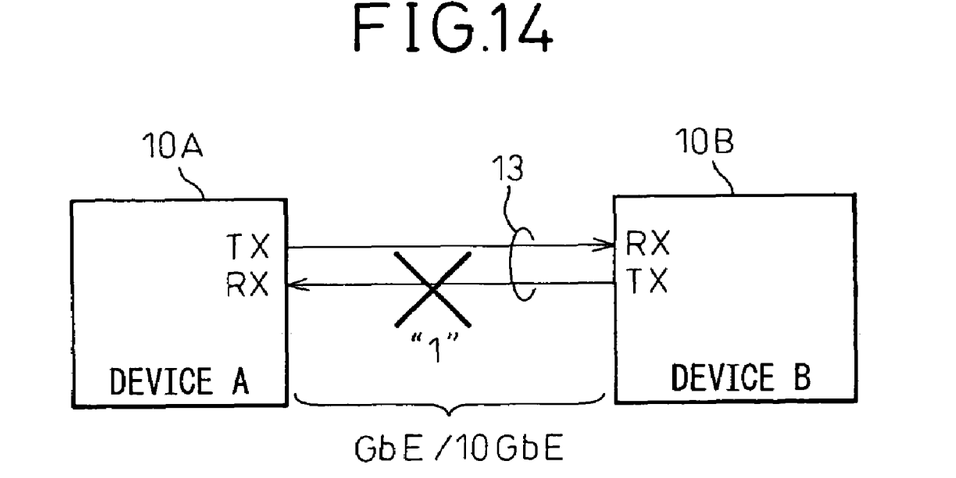
FIG. 14 is a view for explaining fault detection in a GbE/10 GbE interface.

FIG. 14 is a view for explaining fault detection in a GbE/10 GbE interface. In the network shown in this figure, data is transferred by two optical fibers—one for transmission and one for reception. When the auto negotiation function is set on, if the optical fiber breaks at "1" in the figure, the reception side device 10A will detect a line fault by the loss of signal (LOS), while the device 10B will detect the line fault since the auto negotiation with the device 10A will not be able to be completed due to the break in the optical fiber at "1" and therefore the auto negotiation will fail. Due to this, the Ethernet devices 10A and 10B at the two ends are able to detect a line fault.

In such a network, when a situation where a link cannot be established (a situation where data cannot be transferred) occurs with the auto negotiation function set on, in the same way as the 10/100 Base-TX explained above, problems will occur when setting the auto negotiation function off.

When setting the auto negotiation function off, if the optical fiber breaks (x) at "1" in the figure, the device 10A will be able to detect the line fault by the loss of signal (LOS), but the device 10B will not be able to detect the line fault at "1" since it does not communicate with the device 10A for the auto negotiation (set off).

Therefore, when a carrier operates a network by a GbE/10 GbE interface, it normally operates the network with the auto negotiation function set on, but when a problem of connectivity of the auto negotiation, that is, the problem of failure of establishment of a link, occurs between the devices 10A and 10B, sometimes the carrier has to operate the system with the auto negotiation function set off.

If one optical fiber breaks in the middle of operation with the auto negotiation function set off, the device 10A to which that optical fiber is connected at the reception side will be able to detect the fault by the loss of signal (LOS), but the device 10B to which that optical fiber is connected at the transmission side will not longer be able to detect the break in its transmission use optical fiber by the failure of the auto negotiation function. As a result, realization of the carrier grade services will be obstructed.

The present invention takes note of the sequence of the auto negotiation between the GbE/10 GbE interfaces (optical interfaces) of FIG. 14 and provides a network device 10A having the basic configuration shown in FIG. 1. To understand the basic configuration of the present invention, it is necessary to understand the general auto negotiation sequence between Ethernet interfaces. Therefore, this will be explained with reference to FIG. 15.

Figure 15:
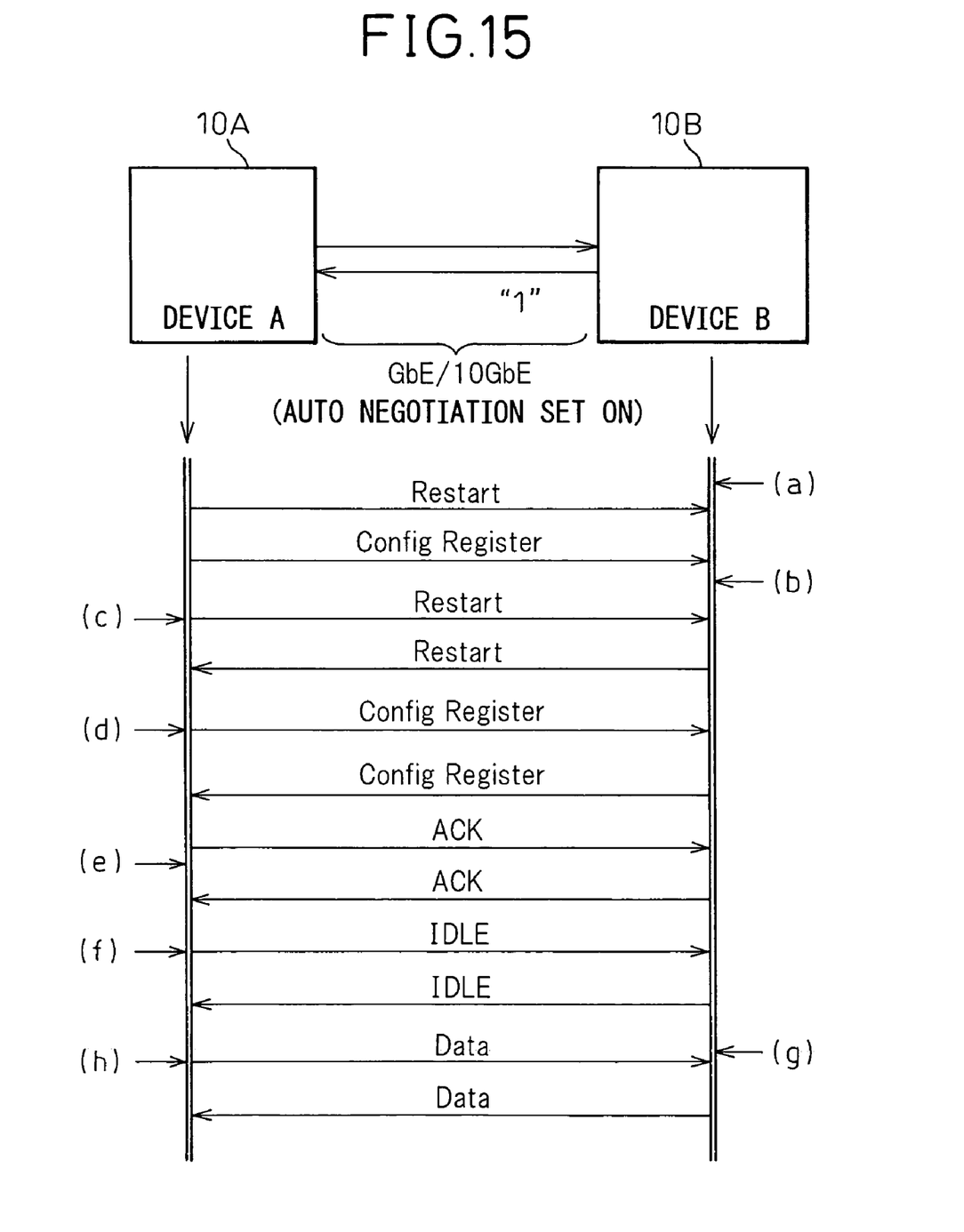
FIG. 15 is a view of a general auto negotiation sequence.

FIG. 15 is a view of a general auto negotiation sequence. In the sequence of this figure, the left end corresponds to the network (Ethernet) device 10A, while the right end corresponds to the other network (Ethernet) device 10B. Here, first, the overall major flow will be viewed below.

(a) The optical fiber breaks at "1" at the top part of the figure.

(b) The break is then repaired and the line is restored.

(c) The auto negotiation sequence is started.

(d) The exchange of information on the communication mode is started. For example, the flow control and other configuration (Config) information are transmitted to the other device 10B.

(e) Similar communication mode information is received from the other device 10B and an acknowledgement (ACK) is returned.

(f) The ACK from the other device 10B is confirmed, then the process for transmission of the user data is entered. Therefore, an IDLE signal is transmitted.

(g) An IDLE signal is returned from the other device 10B, whereupon the auto negotiation sequence at the device 10B side is ended and a state is entered allowing transmission of user data.

(h) The device 10A starts transmitting the user data (Data). Further, it starts receiving user data from the other party (10B).

Further supplementing the explanation, in the above (c), a restart signal is transmitted to notify the device of the start of the auto negotiation sequence. Further, at (d), a Config Register signal is sent back and forth. Further, the IDLE signal at (f) is a signal for the devices to confirm that they have entered the process for transmission of user data. Further, at (g), the auto negotiation sequence at the device 10B is ended. If receiving some sort of user data from the device 10A before the end of this, however, the above problem of connectivity occurs (explained in detail later).

Next, the present invention will be explained in more detail based on FIGS. 2 to 12.

Figure 2:
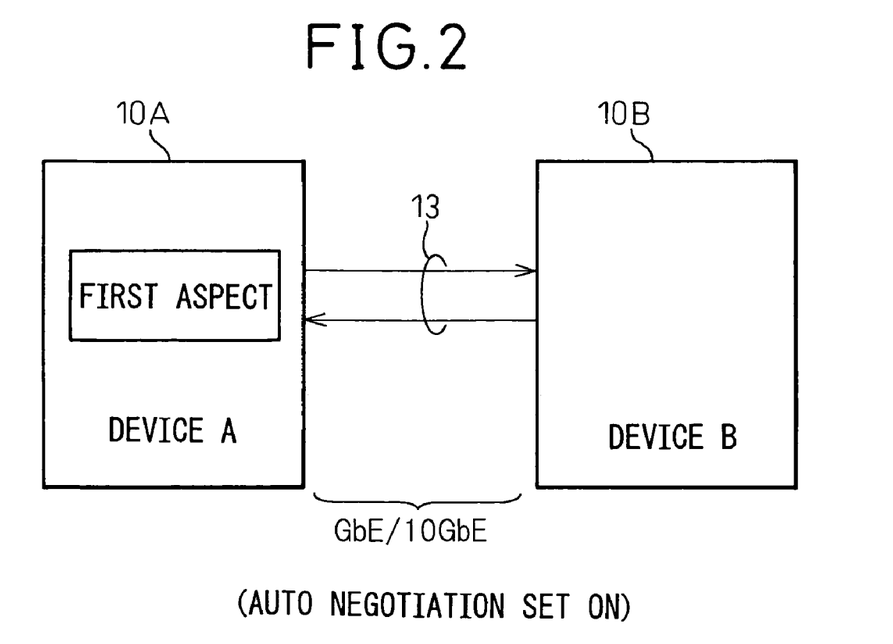
FIG. 2 is a view for explaining the outline of a first aspect of the present invention.

FIG. 2 is a view for explaining an outline of the first aspect of the present invention. This first aspect was explained above and includes further the first strategy of not transmitting data and second strategy of discarding received data.

That is, the first aspect functions to improve the auto negotiation operation. This "improvement" means to enable a link to be established more reliably (solution of problem of connectivity). According to the first strategy, it is made possible to set a data transmission suppression function on/off. According to the second strategy, it is made possible to set the received frame discard function on/off.

That is, in the auto negotiation sequence at normal times shown in FIG. 15, there is no problem of connectivity between the devices (10A and 10B), the auto negotiation sequence ends safely, and transmission of data is shifted to. In this case, connection is possible without problem even if the auto negotiation operation improvement function is set off.

On the other hand, when the above problem of connectivity arises, by devising the means of FIG. 2 (first aspect), the auto negotiation operation is improved in a device (layer 2/3 switch, transmission device, etc.) provided with an Ethernet interface used at a broadband layer 2 network where carriers are primarily launching new services and communication is reliably established (link is established).

In the Ethernet interface of the device 10A provided with an auto negotiation operation improvement function based on the first aspect shown in FIG. 2, the auto negotiation operation improvement function is set on. This auto negotiation improvement function includes setting the data transmission suppression function on/off and setting the received frame discard function on/off. These may be individually set.

In FIG. 2, a single port is equipped at the GbE interface of the device 10A. The auto negotiation operation improvement function is set on at this port 1 and the device 10B is connected to. By devising the above means of the first aspect for the port 1 of the device 10A, an improvement of the auto negotiation operation is realized for various types of network devices provided with Ethernet interfaces.

In an ordinary Ethernet device, the auto negotiation function (automatic communication mode selection function) is just provided at the PHY chip (chip of physical layer interface) (IEEE 802.3). Therefore, when the problem of connectivity occurs, the only means for dealing with this problem was to set the auto negotiation function off.

As opposed to this, the present invention executes the above auto negotiation improvement function, that is, sets the data transmission suppression function on or sets the received frame discard function on, so as to prevent repetition of the auto negotiation sequence when a problem of connectivity of the auto negotiation occurs between connecting devices (10A, 10B), that is, a link cannot be established between Ethernet devices, that is, data cannot be transferred, and enable reliable establishment of a link between connecting devices. Below, the first aspect will be explained more specifically.

Figure 3:
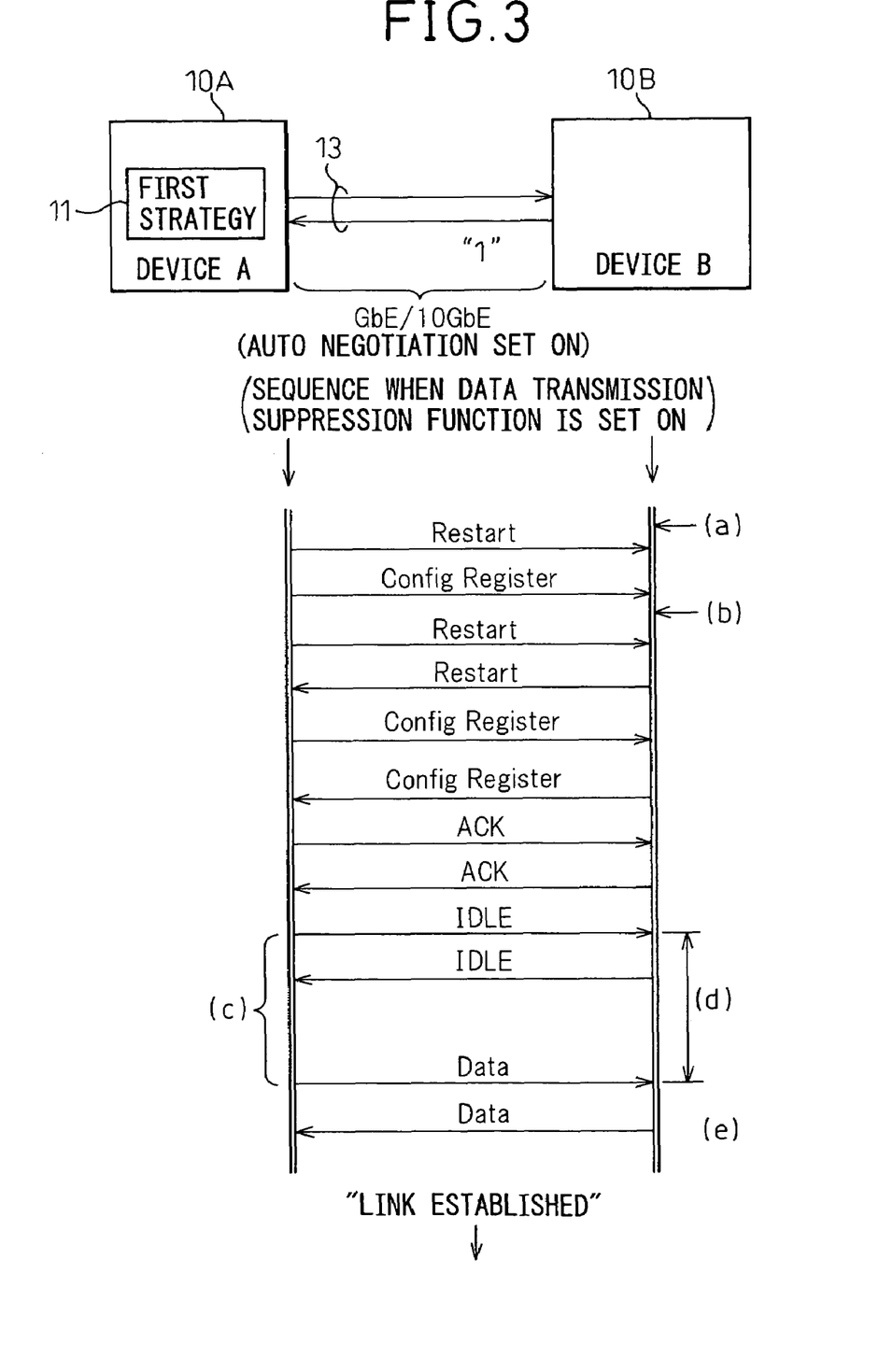
FIG. 3 is a view of an auto negotiation sequence in a first strategy according to the present invention.
Figure 4:
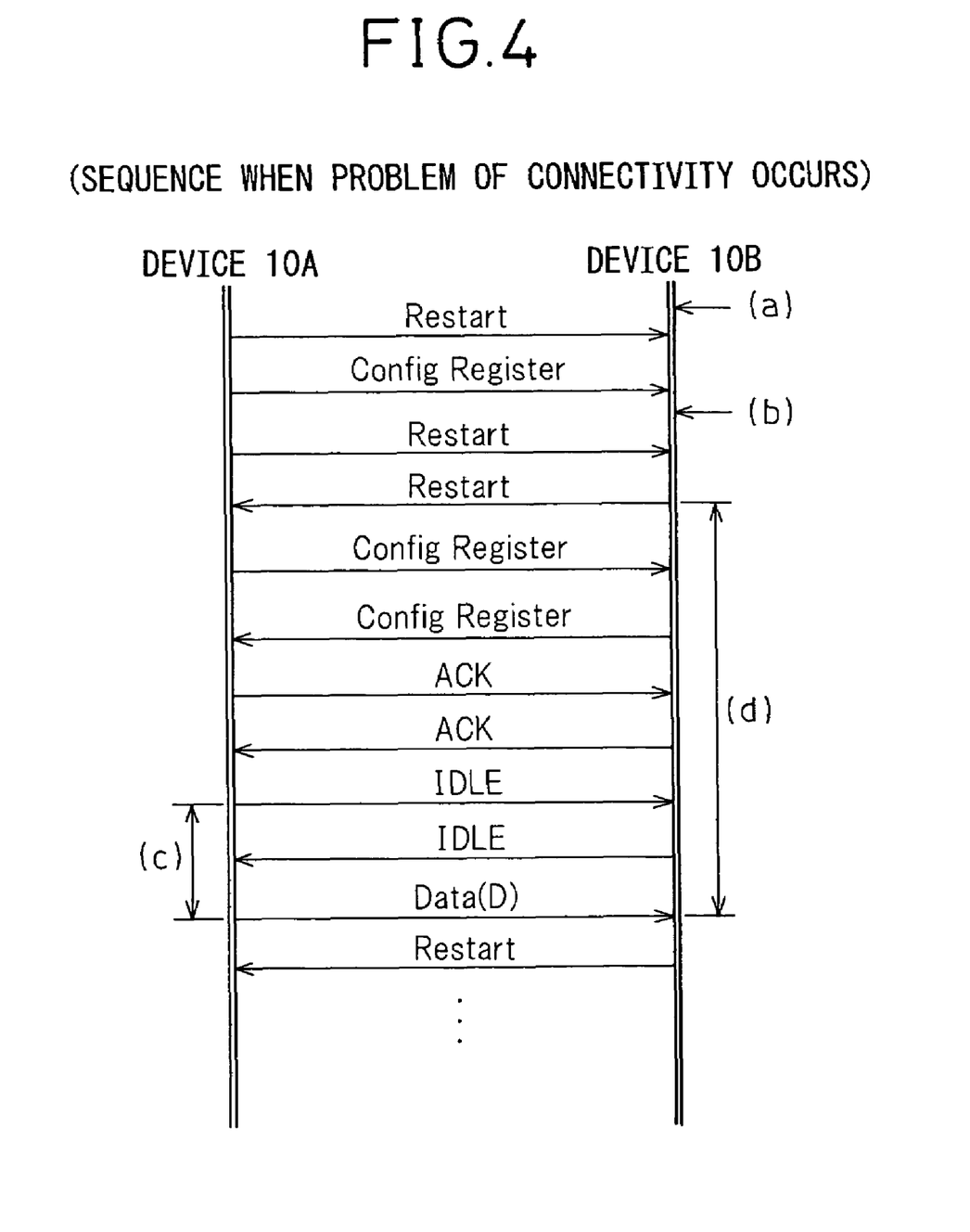
FIG. 4 is a view of the auto negotiation sequence in the case of occurrence of a problem of connectivity.

FIG. 3 is a view of the auto negotiation sequence in the first strategy according to the present invention and corresponds to the first strategy (data nontransmission) in the first function, while FIG. 4 is a view of an auto negotiation sequence in the case of occurrence of the problem of connectivity.

First, referring to FIG. 4, the above conventional problem in connectivity arises by the sequence shown in the drawing. Note that the explanation of FIG. 15 explained above may be applied to the majority of this figure. In FIG. 4, (a) The optical fiber breaks ("1" at the top part of the figure).

(b) The break is then repaired and the line restored. The rest of the operation is as explained with respect to FIG. 15. The problem arises at (c) of the figure.

(c) The above-mentioned IDLE signal is a signal for mutual confirmation of entry into the process for transmission of user data. In this case, according to the provisions of IEEE 802.3, the user data may not be transmitted until the elapse of a fixed time (wait time) of the link timer after the transmission of this IDLE signal. This is so that the timing enabling reliable entry into the transmission process can be ensured between the two devices (10A, 10B).

This being the case, if the device 10A transmits some sort of user data to the device 10B before the elapse of the above fixed time (wait time) of the link timer, the other device 10B receives that user data D before the elapse of the fixed time of the link timer. However, the device 10B receives the user data D regardless of the auto negotiation before the elapse of the fixed time of the link timer, that is, before the completion of the auto negotiation, so ends up being confused over how to handle it.

This confusion is due to the vagueness of the provisions of the above-mentioned IEEE 802.3. To eliminate this, the manufacturers of PHY chips employ their own specifications. For example, according to one specification, the user data D is ignored. According to another specification, the user data D is received, then the sequence is repeated, that is, returns to restart.

Comparing the former specification with the latter specification, according to the former specification, some sort of trouble may occur, but in any case the sequence proceeds and a link is established. On the other hand, according to the latter specification, such trouble is impossible, but conversely the situation indicated at (d) of FIG. 4 occurs. That is, in (d), the device returns to restart and repeats the same sequence again. Depending on the nature of the user data D, the situation will end up one where no link is established. This is the above problem of connectivity. The present invention employs the first strategy of FIG. 3 as a means for eliminating this problem of connectivity.

Referring to the top part of FIG. 3, the device 10A (same for device 10B) includes a link establishing means 11 for executing the first strategy. Further, the auto negotiation sequence when employing the link establishing means 11 using the first strategy is shown in the bottom part of FIG. 3.

In the sequence at the bottom part of FIG. 3, (a) and (b) are as explained in FIG. 4 etc. The subsequent operation is also as shown in FIG. 15. The part of the sequence to be noted is (c) of FIG. 3.

As shown in FIG. 3, at (c), the device 10A transmits the IDLE signal to the device 10B, so suppresses transmission of user data for a period somewhat longer than the conventional case shown in (c) of FIG. 4. "Somewhat longer time" means a time longer than the fixed time (wait time) of the link timer explained above. This fixed time is normally defined as 10 ms, so the above somewhat longer time is suitably set from for example 20, 30, 40, and 50 msec (or 1 sec).

(d) Therefore, the other device 10B receives the user data D from the device 10A after the fixed time of the link timer sufficiently elapses, that is, after the auto negotiation completely ends, so the situation of transition to restart is avoided.

(e) Therefore, here, the device proceeds to the auto negotiation completion status ("link established"), and the user data is normally transferred between the two devices (10A, 10B).

Supplementing the explanation of FIG. 3 more, the following may be said. Here, a single port is equipped at the GbE interface card of the device 10A. The PHY chip mounted at the device 10B is a PHY chip ending up returning to the restart at the auto negotiation sequence when receiving an Ethernet frame (user data) during the auto negotiation sequence (before the automatic switching of the communication mode information ends and the data transmission state is entered, that is, before the auto negotiation sequence of FIG. 15 ends). The operation of returning to the restart of the auto negotiation sequence when receiving an Ethernet frame in this auto negotiation sequence is not clearly described in the provisions of the IEEE 802.3 and depends on the design of the manufacturer of the PHY chip.

At the port 1 of the device 10A, the data transmission suppression function in the auto negotiation operation improvement function is set on and the device 10B is connected to.

As shown in FIG. 3, the device 10B does not receive data from the device 10A until the auto negotiation is completed. Therefore, it is possible to prevent the situation where the PHY chip 22 of the device 10B receives an Ethernet frame during the auto negotiation sequence and consequently returns to restart in the auto negotiation sequence and repeats the sequence. Therefore, the auto negotiation operation is improved and establishment of a link is ensured.

Further, the time for suppression of data transmission at the device 10A can be freely set. As explained above, by setting the time to for example 10 msec, 20 msec . . . 1 sec, the connectivity with Ethernet devices mounting various kinds of PHY chips can be improved. Note that the settings of the data transmission suppression time and the units of settings of the data transmission suppression time shown above are examples. Below, an embodiment of the link establishing means 11 of the first strategy will be explained.

Figure 5:
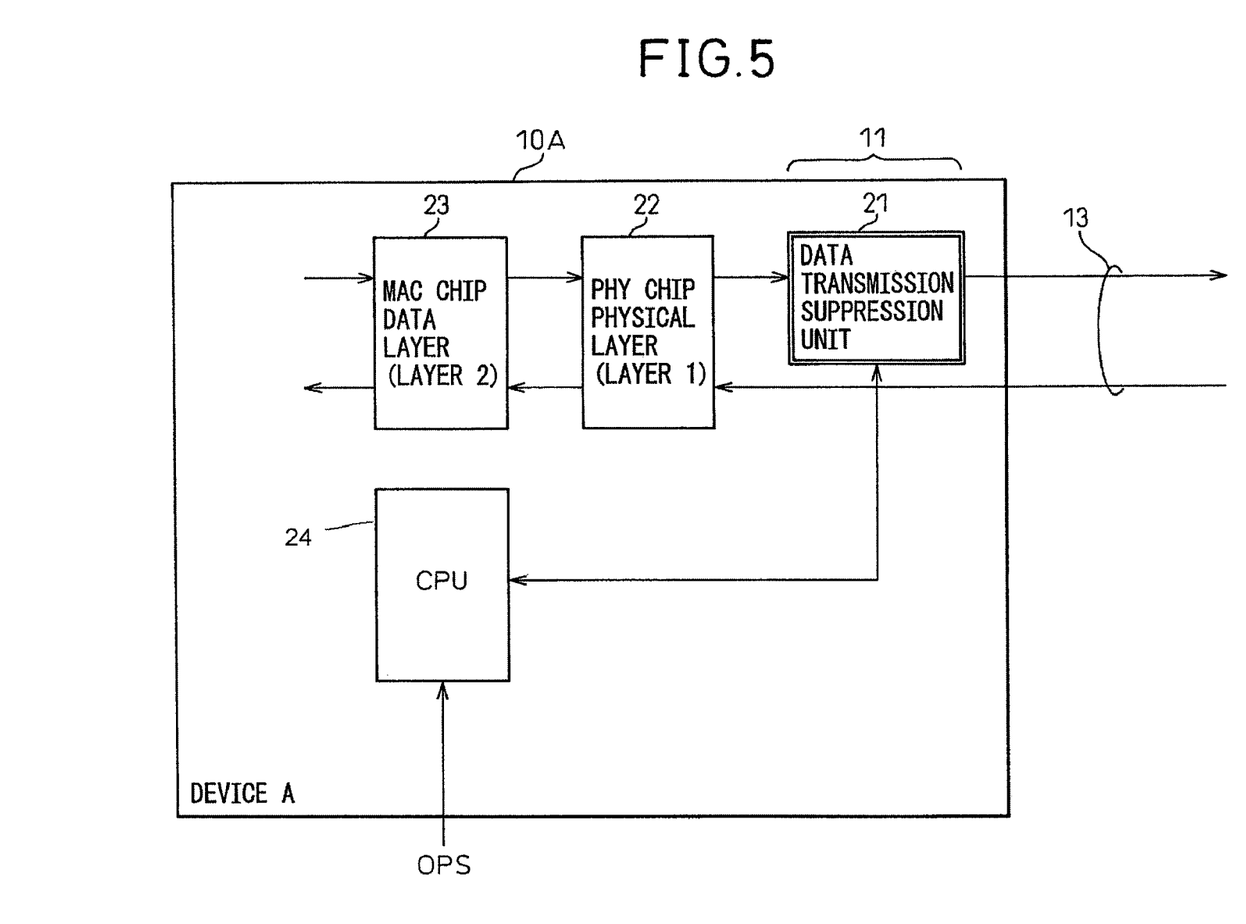
FIG. 5 is a view of an embodiment of a link establishing means according to the first strategy of the present invention.

FIG. 5 is a view of an embodiment of the link establishing means 11 based on the first strategy of the present invention.

The part to be particularly noted in the figure is the data transmission suppression unit 21. That is, the link establishing means 11 is characterized by being comprised of a data transmission suppression unit 21 for suppressing the transmission of user data (Ethernet frames) to the other device 10B until the sequence based on the auto negotiation is completely ended.

In this case, the transmission suppression time for suppressing the transmission of data by the data transmission suppression unit 21 is set longer than the prescribed wait time of the link timer (for example, the above-mentioned 10 msec).

Further, the length of the transmission suppression time is preferably set to a plurality of stages (20, 30, 40, 50 msec etc.) and the optimal transmission suppression time is made selectable. "Optimal" means matching with the properties of the other device 10B to be connected with.

In FIG. 5, the first component connected to the data transmission suppression unit 21 is the above-mentioned PHY chip 22. The auto negotiation operation is mainly performed by this PHY chip 22. The PHY chip 22 further has a media access control (MAC) chip 23 connected to it. The MAC chip 23 views the MAC address of the Ethernet frame and allocates the data which is a layer 2 processing.

Returning to the data transmission suppression unit 21, this is for example comprised of a transistor switch linked with the CPU 24. The CPU 24 sets the data transmission suppression function on/off for the data transmission suppression unit 21. At this time, the CPU 24 also instructs how long the transmission suppression time (20, 30 . . . msec) is to be set. The on/off setting of the function and instruction of the transmission suppression time to the CPU 24, however, are given by the operating system (OPS) of the monitor/control means of the outside carrier.

Figure 6:
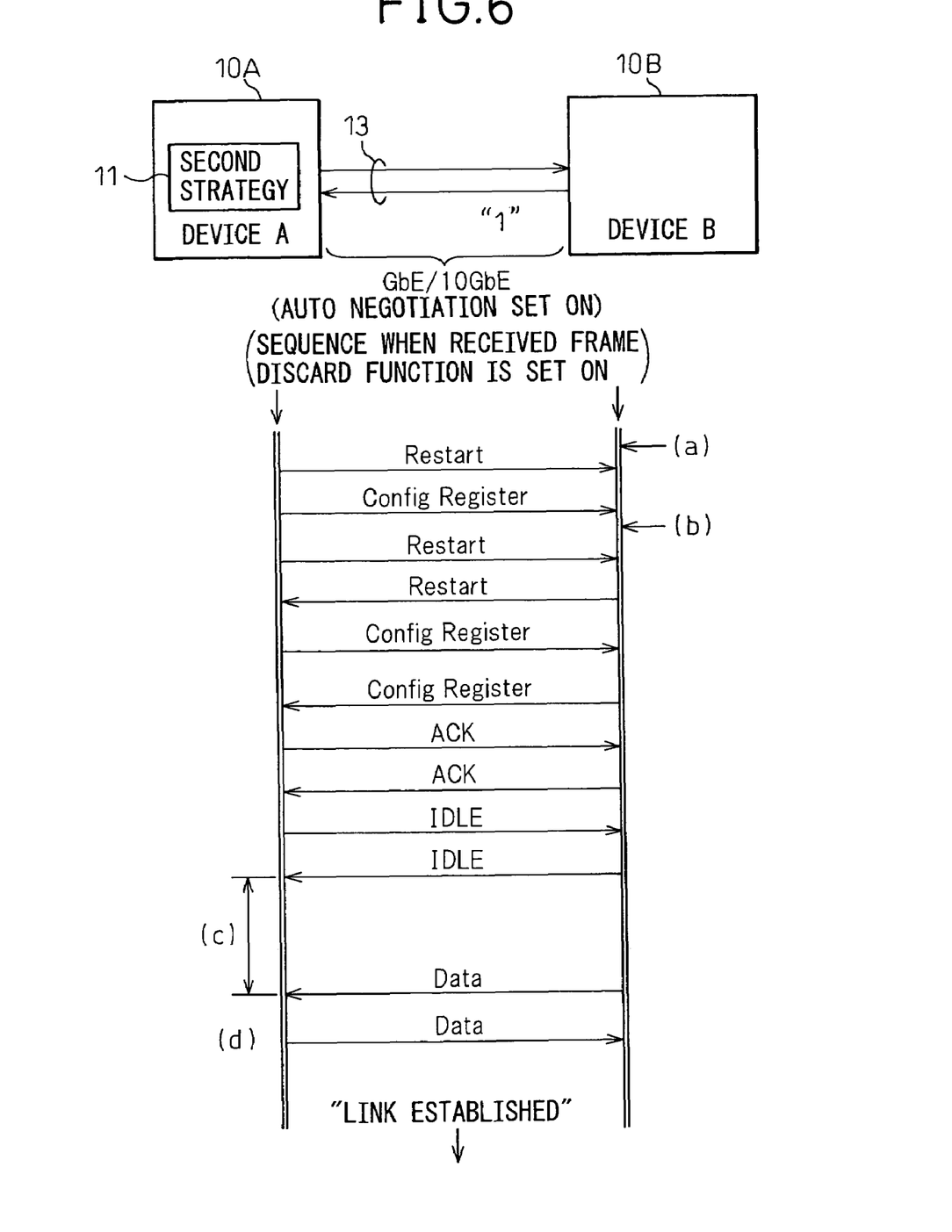
FIG. 6 is a view of an auto negotiation sequence in a second strategy of the present invention.

FIG. 6 is a view of the auto negotiation sequence in the second strategy (reception discard) according to the present invention explained above. Further, FIG. 7 is a view of the auto negotiation sequence when the problem of connectivity occurs.

Figure 7:
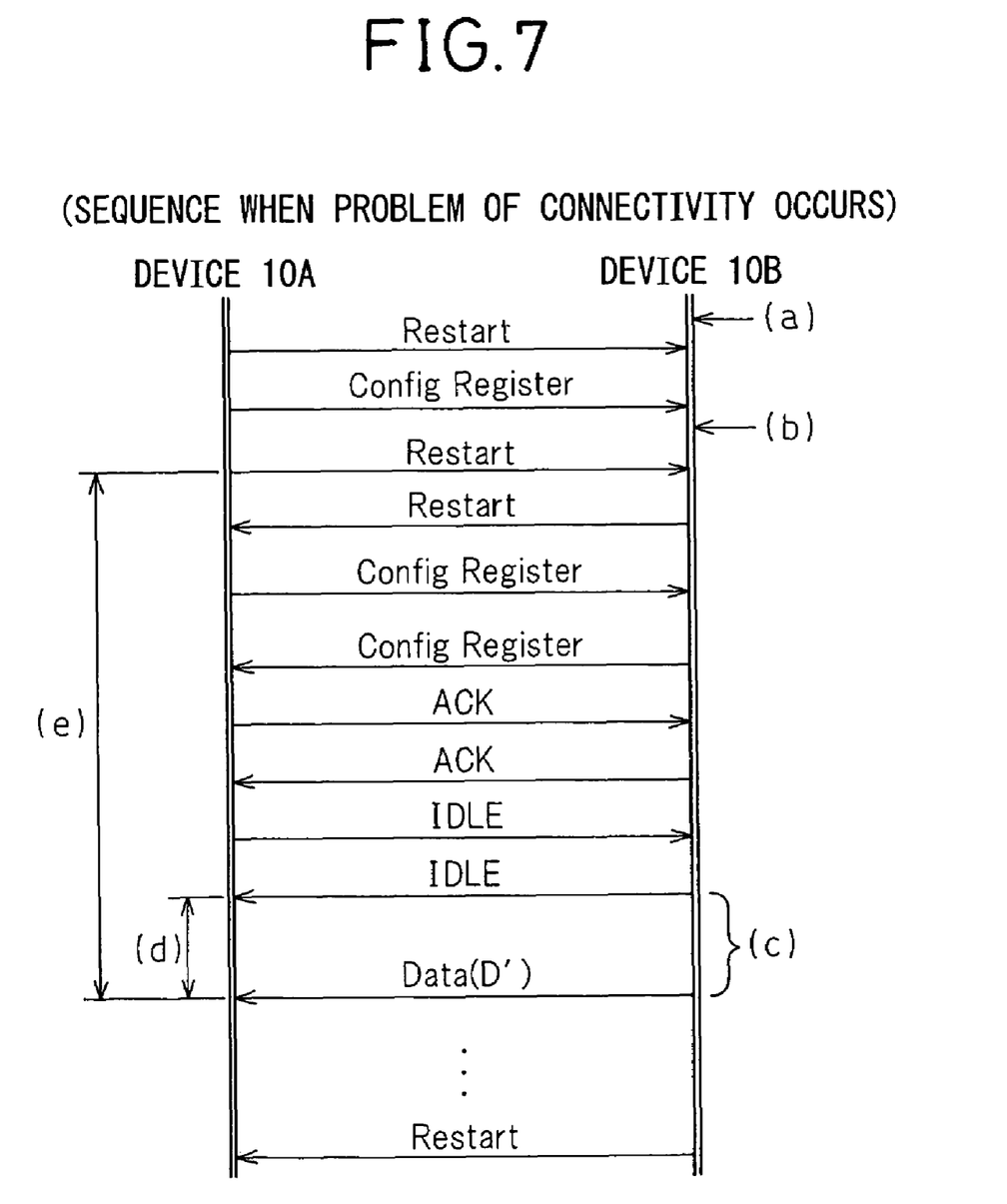
FIG. 7 is a view of the auto negotiation sequence in the case of occurrence of a problem of connectivity.

First, referring to FIG. 7, the conventional problem in connectivity explained above occurs even in the sequence of this figure and is not limited to FIG. 4. Note that the explanation of the above FIG. 15 applies to the majority of this figure. In FIG. 7, (a) A break occurs in the optical fiber ("1" at top part of FIG. 6).

(b) This break is then repaired and the line is restored. The subsequent operation is as explained in FIG. 15. The problem arises at (c) and (d) of FIG. 7.

(c) In accordance with the provisions of the IEEE 802.3, the device 10B transmits the IDLE signal, then transmits the user data D' toward the device 10A after the elapse of a fixed time (wait time) of the link timer explained above. This is transmission of data after the elapse of the fixed time by the link timer, that is, after the auto negotiation is completely finished, and therefore does not pose any problem.

(d) However, at the device 10A receiving this user data D', reception is also possible before the complete end of the auto negotiation at the device 10A. That is, sometimes this user data D' ends up being received before the elapse of the fixed time by the link timer at the device 10A.

(e) This being the case, as explained with reference to the above FIG. 4, depending on how the PHY chip 22 is made, the device 10A returns again to restart upon receipt of the user data D' and repeats again the auto negotiation sequence up to then and therefore no link is established. The present invention employs the second strategy of FIG. 6 as one means for eliminating this problem of connectivity.

Referring to the top part of FIG. 6, the device 10A (also device 10B) has a built-in link establishing means 11 for executing the second strategy. The auto negotiation sequence when using the link establishing means 11 according to the second strategy is shown in the bottom part of FIG. 6.

In the sequence at the bottom part of FIG. 6, (a) and (b) are as explained in the above FIG. 7 e.t.c. The subsequent operation is as shown in FIG. 15. The part of the sequence to take note of is (c) of FIG. 6.

As shown in FIG. 6, in (c), after the device 10B transmits the IDLE signal to the device 10A, the transmission of the user data is kept suppressed for a somewhat longer time than the conventional case. "Somewhat longer time" means a time longer than the fixed time (wait time) of the link timer explained above. This fixed time is normally defined as 10 ms, so the above somewhat longer time is suitably set from for example 20, 30, 40, and 50 msec (or 1 sec).

Therefore, before the fixed time of the link timer sufficiently elapses, that is, before the auto negotiation completely ends, the device 10A refuses the reception of the user data D' from the device 10B, so the situation of transition to restart is avoided, the routine proceeds to the auto negotiation completion status ("link established"), and the user data is normally transferred between the two devices (10A, 10B).

Supplementing the explanation of FIG. 6 more, the following may be said. Here, a single port is equipped at the GbE interface card of the device 10A. The PHY chip 22 mounted at the device 10A is such a PHY chip that ends up returning to the restart of the auto negotiation sequence when receiving an Ethernet frame during the auto negotiation sequence (before the automatic switching of the communication mode information ends and the data transmission state is entered, that is, before the auto negotiation sequence of FIG. 15 ends).

The received frame discard function in the auto negotiation operation improvement function is set on at the port 1 of the device 10A and the device 10B is connected to. In the device 10A, due to the auto negotiation operation improvement function, even if an Ethernet frame is transmitted from the device 10B during the auto negotiation sequence, that Ethernet frame is discarded. Due to this, repetition of the auto negotiation sequence is prevented.

As explained above, the operation of the auto negotiation is improved and establishment of a link is ensured. Further, it is possible to set the time for discarding the received frames at the device 10A. By setting the received frame discard time at 10 msec, 20 msec . . . , it is possible to improve the connectivity with an Ethernet device mounting various PHY chips 22. Note that the settings of the received frame discard time and the setting units of the received frame discard time shown above are examples.

Below, an embodiment of the link establishing means 11 according to the second strategy will be explained.

Figure 8:
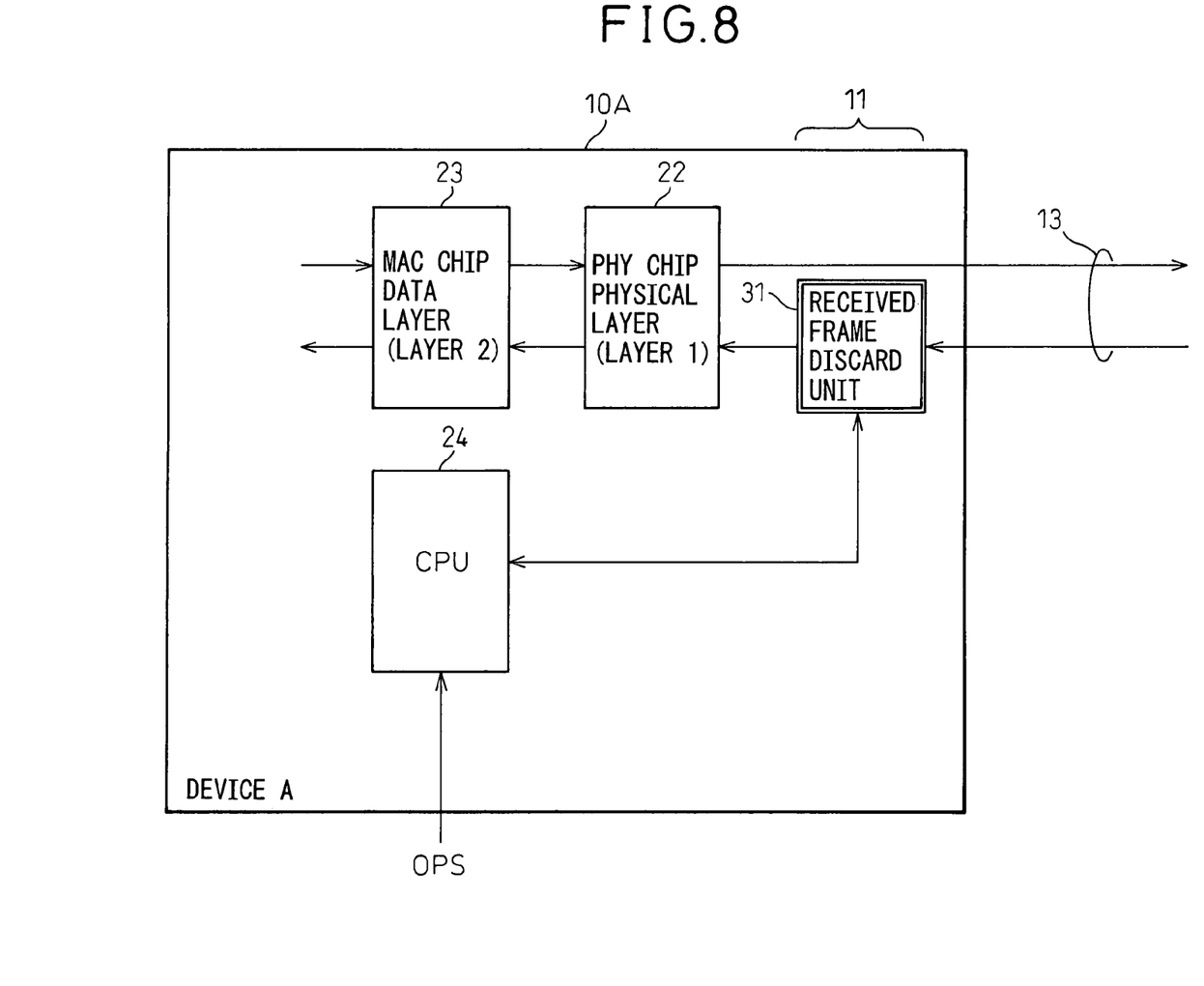
FIG. 8 is a view of an embodiment of a link establishing means according to the second strategy of the present invention.

FIG. 8 is a view of an embodiment of the link establishing means 11 based on the second strategy according to the present invention.

The part to particularly note in this figure is the received frame discard unit 31. That is, the link establishing means 11 is comprised of a received frame discard unit 31 for discarding a frame received from the other device 10B until the sequence based on the auto negotiation is completed.

In this case, the discard time for discarding a received frame from the received frame discard unit 31 is set longer than the wait time (for example, above 10 msec) of the link timer prescribed.

Further, the length of the discard time is preferably set to several stages (20, 30, 40, 50 msec etc.) to enable the optimal discard time to be selected. "Optimal" means matching with the property of a device 10B to be connected with.

The PHY chip 22 connected to the received frame discard unit 31 and the MAC chip 23 connected to this are as explained in FIG. 5.

On the other hand, the CPU 24 connected to the received frame discard unit 31 sets the received frame discard function of the discard unit 31 on/off. Further, at this time, the CPU 24 instructs how much to make the discard time (20, 30, . . . msec). However, the on/off setting and the instruction of the discard time to the CPU 24 are given from the OPS explained in FIG. 5.

The received frame discard unit 31 can be configured by for example a transistor switch in the same way as the data transmission suppression unit 21. The switch (21, 31) function however may also be realized by software.

Whether the reception switch (21, 31) function is realized by hardware or realized by software, the switch function becomes active by the above IDLE signal. That is, the switch forming the received frame discard unit 31 of the device 10A can be made active when detecting by the PHY chip that the IDLE signal has been received from the device 10B at the top part of FIG. 6. On the other hand, the switch forming the data transmission suppression unit 21 of the device 10A can be made active triggered by an IDLE signal (bottom part of FIG. 3) transmitted from the PHY chip 22 of the device 10A.

Next, the second aspect of the invention able to improve the auto negotiation operation explained above will be explained. This second aspect provides a strategy for positively determining the cause of the above problem of connectivity as explained above. When the first aspect (FIG. 1 to FIG. 8) works with this second aspect, it can solve the problem of connectivity more quickly and accurately.

Figure 9:
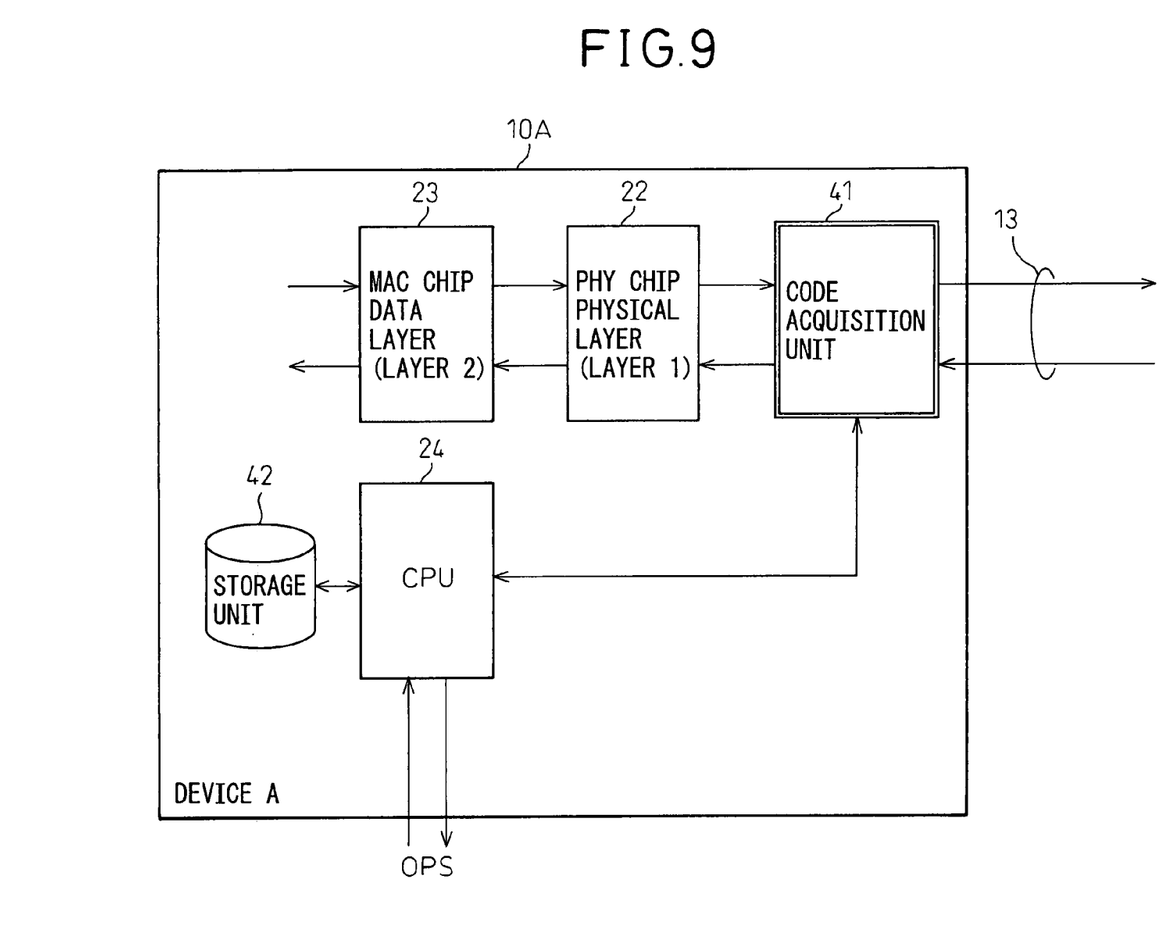
FIG. 9 is a view of an embodiment according to a second aspect of the present invention.

FIG. 9 is a view of an embodiment according to the second aspect of the invention. According to what is shown in FIG. 9, the code acquisition unit 41 and the storage unit 42 are the characterizing parts of this embodiment. The other parts (22, 23, and 24) are as explained above.

Specifically, the embodiment of FIG. 9 shows a network device 10A provided with an Ethernet interface and interconnecting with another device 10B by auto negotiation, having a code acquisition unit 41 for acquiring a transmitted auto negotiation code transmitted to the other device 10B and a received auto negotiation code received from the other device 10B and a storage unit for successively storing the transmitted auto negotiation code and received auto negotiation code acquired from the code acquisition unit 41 in order of occurrence successively in time series and analyzing the cause for when a link cannot be established with the other device 10B by a log of the auto negotiation operation based on the stored data of the storage unit 42.

Note that the cause may be analyzed at the OPS by transmitting the stored data to there. It is also possible to transmit the stored data to the other device 10B and analyze it there or have the device 10A analyze the data on the spot.

For analyzing the cause, the transmitted and received auto negotiation codes are displayed on the display in time series in order of occurrence. This is shown in the figure.

Figure 10:
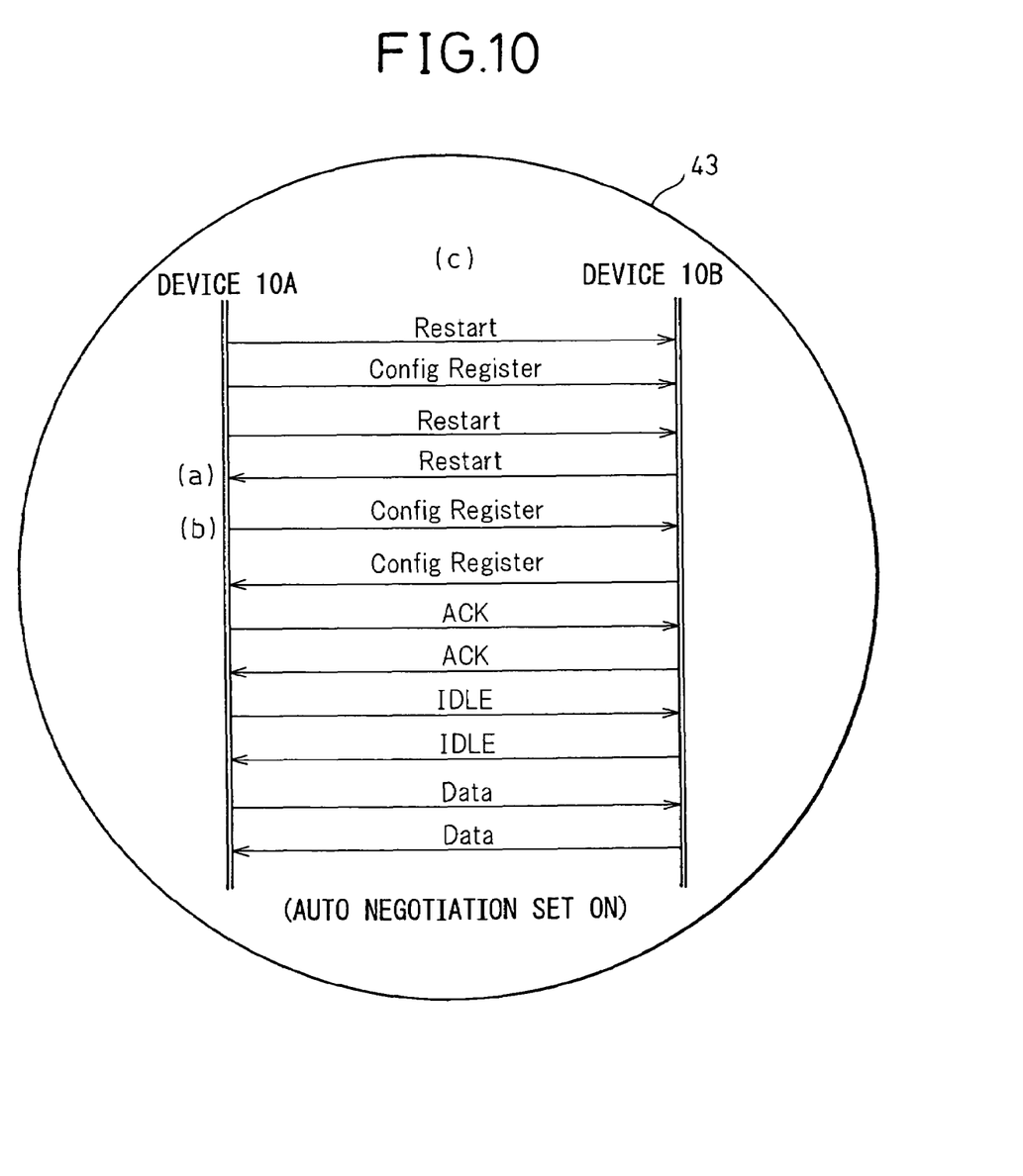
FIG. 10 is a view of an example of display of a work log in the second aspect of the present invention.

FIG. 10 is a view of an example of display of the work log in the second aspect of the present invention. Reference numeral 43 in the figure shows the screen of the above display.

In the figure, for example (a) shows one of the received code groups of the auto negotiation, and (b) shows one of the transmitted code groups of the auto negotiation. If displaying in parallel the group of (a) and the group of (b) successively in time series, an overall log display will be obtained like in (c) ((a)+(b)=(c)).

According to this log display (c), it can be determined at a glance what kind of information was transferred at what time. If the above problem of connectivity arises, the occurrence of this problem can be instantly determined by viewing this log display (c).

Supplementing the explanation further, the view of the system configuration corresponding to the sequence of FIG. 10 is the same as that shown, e.g., at the top part of FIG. 6. However, the "second strategy" at the top part of FIG. 6 should be read as the "second aspect". In this system diagram, the GbE interface card of the device 10A is provided with a single port. This port 1 is connected to the device 10B while setting the auto negotiation code reception function in the auto negotiation operation improvement function on.

According to the second aspect of the invention, in the Ethernet interface, enabling acquisition of reception information of each sequence in the auto negotiation and therefore an analysis means is realized, for when for example the sequence will not complete and linkup is not established, by displaying, in parallel and in time series, the auto negotiation sequences of the devices 10A/10B in combination with an auto negotiation transmission code of the Ethernet interface of the device 10A. Due to this, there is no longer any need to newly prepare a sniffer or other auto negotiation analysis tool (network analyzer). There is also an effect of improvement of operational maintenance.

Finally, a third aspect of the invention able to improve the auto negotiation operation explained above will be explained. This third aspect provides a strategy for positively eliminating the above problem of connectivity and is effective when used together with the above first aspect of the invention (FIG. 1 to FIG. 8).

Figure 11:
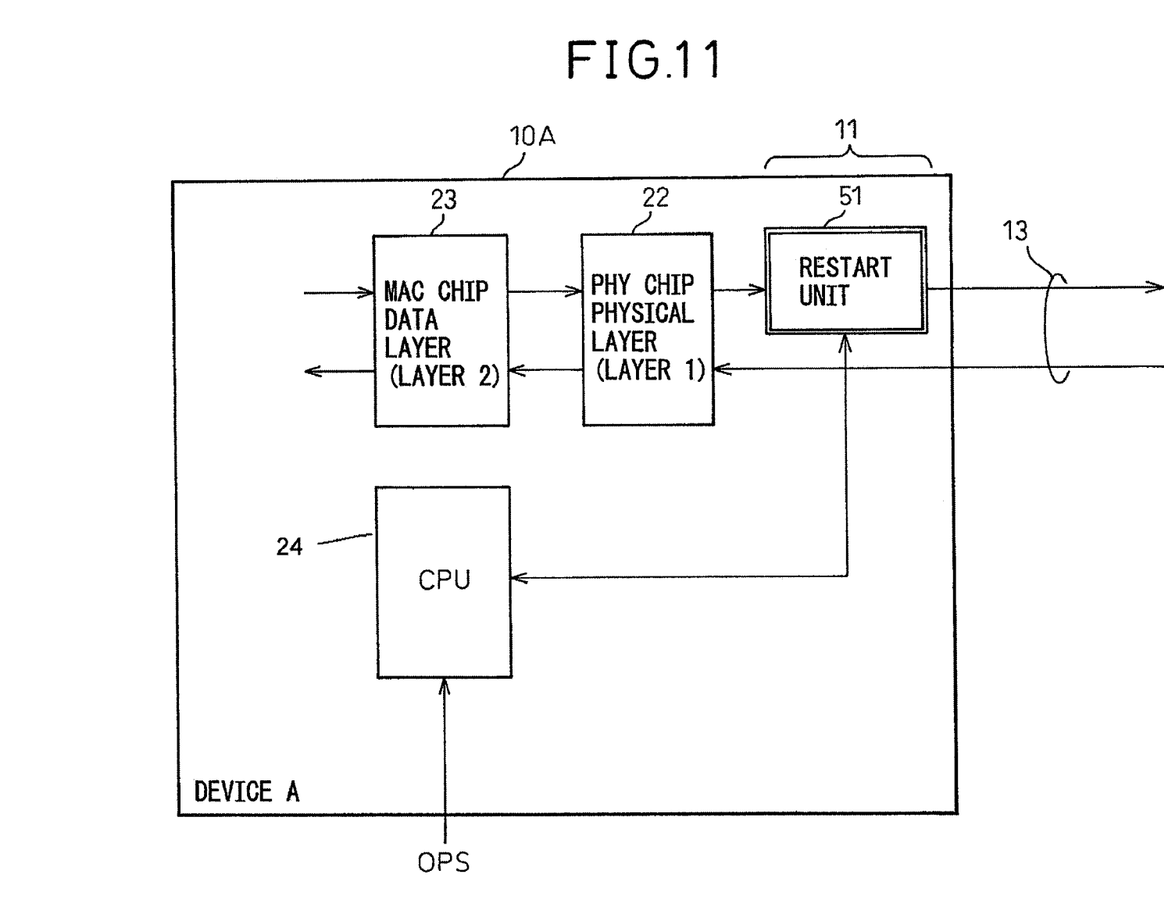
FIG. 11 is a view of an embodiment according to a third aspect of the present invention.

FIG. 11 is a view of an embodiment according to the third aspect of the present invention. According to what is shown in FIG. 11, the restart unit 51 is the characterizing part of this embodiment. The other parts (22, 23, and 24) are as explained above. Note that in this figure, the restart unit 51 is drawn as being independent, but it may also be integrally built into, for example the PHY chip 22.

Specifically, the embodiment of FIG. 11 is a network device 10A provided with an Ethernet interface and interconnecting with another device 10B by auto negotiation, the device having a restart unit 51 for transmitting a restart code to the other device 10B and compulsorily turning on the restart unit 51 when a link by auto negotiation with the device 10B is not established. Note that this operation of compulsorily turning on the restart unit 51 may be instructed manually by the operator or the CPU 24 may autonomously issue an on command by detecting repetition of the auto negotiation, or the CPU 24 may issue an on command upon receipt of the above OPS command.

Figure 12:
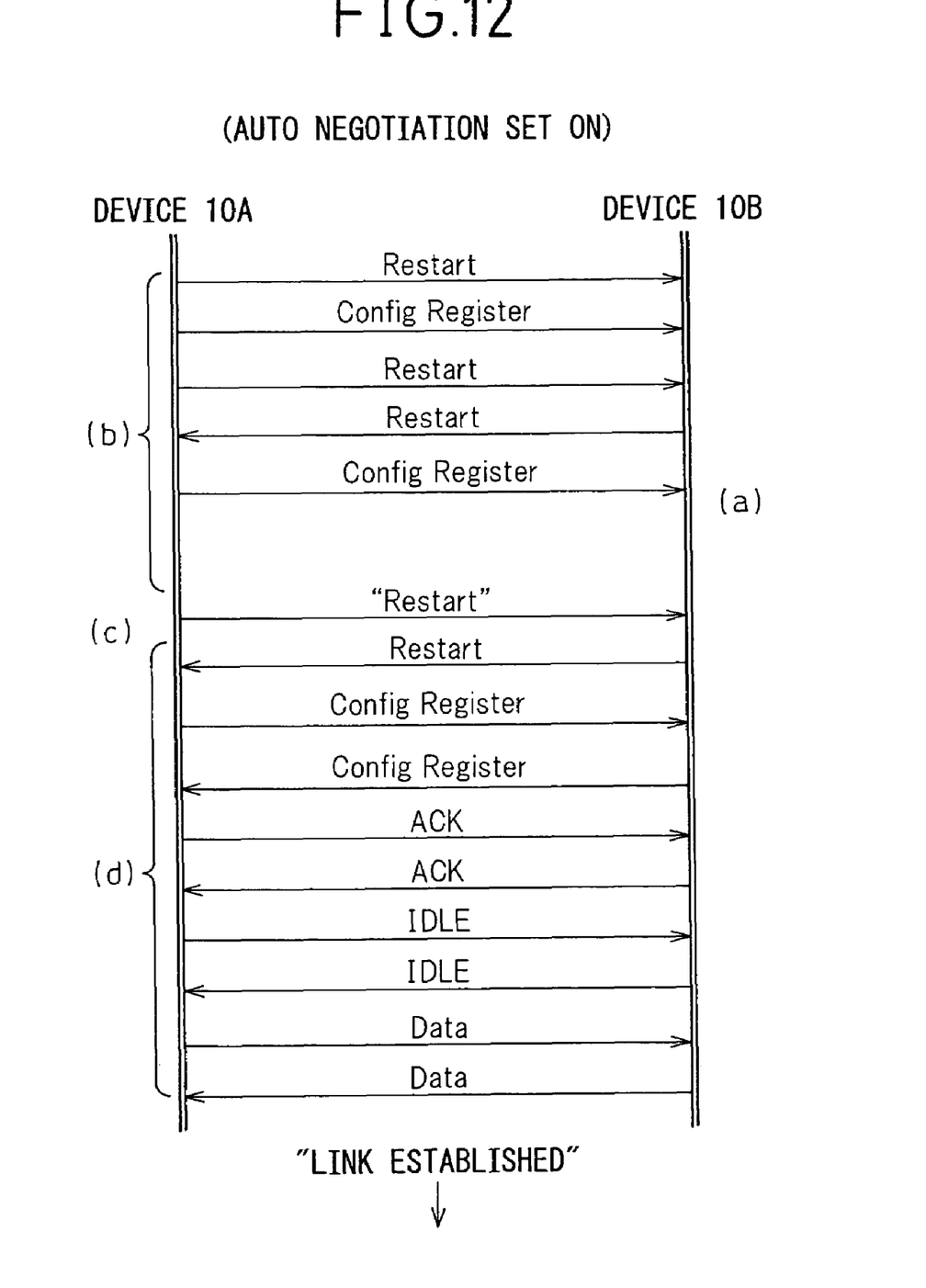
FIG. 12 is a view of an auto negotiation sequence in a third aspect of the present invention.

FIG. 12 is a view of the auto negotiation sequence in the third aspect of the invention. In this figure, the states (a) to (d) mean the following:

(a) The auto negotiation sequence is stopped in the middle of the sequence after for example the break at "1" at the top part of FIG. 6 is repaired to restore the line.

(b) A link cannot be established since the operation stops midway in the sequence operation at the device 10B.

(c) Therefore, the auto negotiation restart code "Restart" is transmitted through the restart unit 51 to the device 10B, for example manually.

(d) Here, transition to the initial restart state of the auto negotiation sequence is prompted and establishment of a link is retried.

Supplementing the explanation further, the view of the system configuration corresponding to the sequence of FIG. 12 is the same as that shown at the top part of FIG. 6. However, the "second strategy" at the top part of FIG. 6 should be read as the "third aspect". In this system diagram, the GbE interface card of the device 10A is provided with a single port. This port 1 is provided with a restart code transmission function in the auto negotiation operation improvement function and is connected to the device 10B. It is possible to transmit the auto negotiation restart code, for example manually from the device 10A.

According to the third aspect of the invention, when the auto negotiation sequence has stopped due to some reason or another at the connecting device 10B, it is possible to establish a link with the connecting device 10B by prompting transition of the auto negotiation sequence to the initial start state by reception of the auto negotiation restart code.

Note that the data transmission suppression unit 21, the received frame discard unit 31, the code acquisition unit 41, and the restart unit 51 were all shown as independent, but it is preferable to provide the device with a combination of any two or more of these. Of course, it is also possible to provide them all.

The present invention is an effective means for when desiring to realize an Ethernet service improved in reliability in function and in management of operation and in economy by improving the auto negotiation operation in a network device (layer 2/3 switch, transmission device, etc.) provided with an Ethernet interface used for a layer 2/3 network where carriers are primarily launching new services.

While the invention has been described with reference to specific embodiments chosen for purpose of illustration, it should be apparent that numerous modifications could be made thereto by those skilled in the art without departing from the basic concept and scope of the invention.

What is claimed is:

1. A network device provided with an Ethernet interface and interconnecting with another device by auto negotiation, comprising:
    a link establishing function unit compulsorily establishing a link with said other device; and
    an on/off setting function unit setting on/off the function of said link establishing function unit, wherein
    said link establishing function unit is comprised of a data transmission suppression unit for suppressing transmission of user data to said other device until a sequence based on said auto negotiation is completely ended, wherein
    a transmission suppression time during which said data transmission suppression unit suppresses transmission of data is set to be longer than a wait time of a prescribed link timer.

2. A network device as set forth in claim 1, setting a length of said transmission suppression time to one selected from lengths of a plurality of stages.

3. A network device provided with an Ethernet interface and interconnecting with another device by auto negotiation, comprising:
    a link establishing function unit compulsorily establishing a link with said other device; and
    an on/off setting function unit setting on/off the function of said link establishing function unit, wherein said link establishing function unit is comprised of a received frame discard unit discarding frames received from said other device until a sequence based on said auto negotiation is completely ended, wherein
    a discard time for discarding received frames by said received frame discard unit is set to be longer than a wait time of a prescribed link timer.

4. A network device as set forth in claim 3, setting a length of said discard time to one selected from lengths of a plurality of stages.

5. A network device as set forth in claim 1, further having a restart unit for transmitting a restart code to the other device and compulsorily turning on the restart unit when a link by auto negotiation with the other device is not established.

* * * * *